United States Patent [19]
Riddle

[11] Patent Number: 5,166,931
[45] Date of Patent: Nov. 24, 1992

[54] COMMUNICATIONS NETWORK DYNAMIC ADDRESSING ARRANGEMENT

[75] Inventor: Guy G. Riddle, Piscataway, N.J.

[73] Assignee: AT&T Bell Laboratories, Murray Hill, N.J.

[21] Appl. No.: 576,820

[22] Filed: Sep. 4, 1990

[51] Int. Cl.⁵ .................. H04L 12/66; H04L 12/46
[52] U.S. Cl. ............................ 370/94.1; 370/85.13
[58] Field of Search .............. 370/94.1, 94.2, 85.13, 370/85.14, 60, 60.1, 85.1

[56] References Cited

U.S. PATENT DOCUMENTS

| | | | |
|---|---|---|---|
| 4,689,786 | 8/1987 | Sidhu et al. | 370/94 |
| 4,933,938 | 6/1990 | Sheehy | 370/85.13 |
| 4,975,906 | 12/1990 | Takiyasu et al. | 370/85.13 |

FOREIGN PATENT DOCUMENTS 176347  8/1987  Japan .............................. 370/85.14

OTHER PUBLICATIONS

"Frontiers in Computer Communications Technology", Proc. ACM SIGCOMM '87 Workshop, Aug. 11-13, vol. 17, No. 5, "The Kiewit Network: A Large Appletalk Internetwork", pp. 15-26.

Dr. Dobb's Journal, Oct. 1987, "Async Appletalk", R. W. Brown et al., pp. 18-28.

Andrew Seybold's Outlook on Professional Computing, "Apple & Novell Announce NetWare for the Macintosh", pp. 6-7, Jun 24, 1988, vol. 6, No. 11.

Datamation, "The Longer Reach of AppleTalk", Aug. 1, 1989, A. Jenkins, pp. 59-60.

Connections, "Current Developments in Wide Area Appletalk", vol. 4, No. 2, (1990), D. Magorian, pp. 3-8.

Primary Examiner—Douglas W. Olms
Assistant Examiner—Wellington Chin
Attorney, Agent, or Firm—F. B. Luludis

[57] ABSTRACT

A facility is provided which obviates the need of administering network addresses in an internetwork composed of a plurality of networks by assigning to each network a common source address, rather than a unique network address. In addition, and when a connection is established between two of the networks, then, for the duration of the connection, each of those networks is dynamically associated with a respective second network address and a respective connection address, in which the connection address is used as a destination address. Accordingly, when one of the networks transmits a message to the other network, the internetwork identifies the proper connection as a function of the message destination address and then forwards the message to the intended recipient. In doing so, the internet changes the message source address to the second address associated with the one changes network and the message destination address to the second address associated with the other one of the two networks. Similarly, the source and destination addresses of a message received via the internet are respectively changed to the common address and associated connection address before the message is forwarded to the intended recipient.

12 Claims, 5 Drawing Sheets

FIG. 2

| NETWORK ADDRESS | PORT/CHANNEL | TO |
|---|---|---|
| 60009 | 1 | 65000 |
| 60100 | 5 | 60003 |
| ⋮ | ⋮ | ⋮ |

| NETWORK ADDRESS | PORT/CHANNEL | TO |
|---|---|---|
| 60003 | 2 | 65000 |
| 60005 | 7 | 60009 |
| ⋮ | ⋮ | ⋮ |

501
502
500-2

COMMUNICATIONS NETWORK DYNAMIC ADDRESSING ARRANGEMENT

FIELD OF THE INVENTION

The invention relates to the task of assigning to networks forming a so-called internetwork respective network addresses, and more particularly relates to dynamically assigning such network addresses as they are needed.

BACKGROUND OF THE INVENTION

As is well-known, a plurality of local area networks may be interconnected using so-called gateways, bridges and/or routers to form a so-called internetwork. The advantage of an internetwork allows a device served by one network to communicate with a device served by another network, even through the devices may be separated from one another by a significant distance. The routing of messages between two networks via the internetwork is achieved by assigning to each network a unique network address. It can be appreciated that if two or more networks in an internetwork were assigned the same network address then the chance of misrouting a message to the wrong network would indeed be high.

To prevent such misrouting, the provision of network addresses is typically administered by a person commonly referred to as a network administrator. The administrator ensures that each network in the internetwork is assigned a unique network address.

The administration of network addresses is a simple task when an internet is small. However, the task becomes somewhat unwieldy in the case of a large internetwork, and is exacerbated when an incorrect network address is programmed into a network or when a number of internetworks are merged with one another. In the latter instance, it is likely that one or more of the internetworks could be using the same network addresses, which needs to be dealt with before the internetworks can be merged with one another. Reconciling network addresses among a number of internetworks could turn out to be difficult task.

SUMMARY OF THE INVENTION

The art of administering network addresses in an internetwork composed of a plurality of networks is advanced by assigning to each such network, in accordance with the invention, a common internetwork address, and when a connection is established between two of the networks, then dynamically associating those two networks with respective second network addresses and respective connection addresses, in which each of those networks is supplied its respective connection address for use as a destination address. Accordingly, when an internetwork facility, such as an internetwork gateway, receives from its associated one of the two networks, a message the facility selects the proper connection as a function of the message destination address and then forwards the message to the intended recipient. In doing so, the facility changes the common source address to the second address associated with the one network and changes the message destination address to the second address associated with the other one of the two networks. Alternatively, a message received via the internetwork is changed such that the destination address is changed to the common internetwork address and the source address is changed to the connection address associated with the intended recipient.

BRIEF DESCRIPTION OF THE DRAWING

In the drawing:

FIGS. 2 and 3 illustrate translation tables that are used in the practice of the invention within the internetwork of FIG. 1;

DETAILED DESCRIPTION

Figure 1:
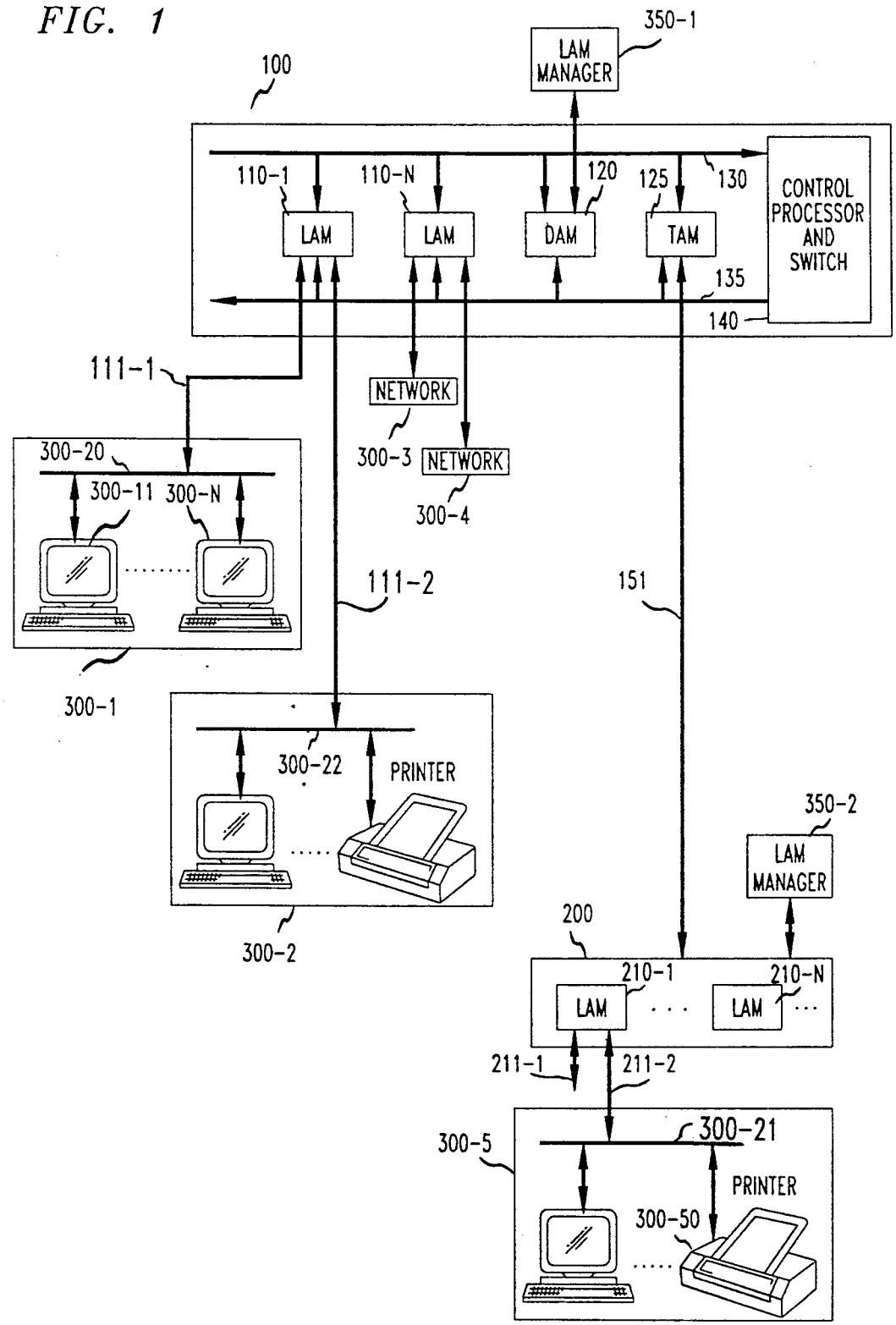
FIG. 1 is a broad block diagram of an internetwork in which the principles of the invention may be practiced.

Turning now to FIG. 1, there is shown a broad block diagram of an internet comprising a plurality of local area networks 300 interconnected via respective packet switches 100 and 200 each operating as a so-called internet gateway. In an illustrative embodiment of the invention, the architecture of switches 100 and 200 are similar to one another. Therefore, a discussion of one such switch pertains equally well to other.

In particular, packet switch 100 may be any suitable packet switch capable of transporting from a source to a destination a data packet (message). Such a packet switch is also referred to as a Local Area Network (LAN), and may be, for example, the well-known Datakit (trademark of AT&T) virtual circuit switch available from AT&T. Hereinafter, packet switch 100 will be referred to as LAN gateway 100, and includes, inter alia, a clock module (not shown) and a so-called printed wire backplane equipped with connectors for receiving respective port modules. The port modules include, for example, LAN Access Modules (LAM) 110-1 through 110-N, a plurality of Data Access Modules (DAM), e.g., DAM 120, a plurality of Trunk Access Modules (TAM), e.g., TAM 125, and a control processor and switch 140. The printed wire backplane implements a transmit bus 130 and a broadcast bus 135. The backplane also provides signal distribution from the clock module to the other modules.

A port module, e.g., Lan Access Module (LAM) module 110-1, that is plugged into a backplane connector is automatically connected to busses 130 and 135. Bus 130 operates to transport to control processor and switch 140 a data message placed on bus 130 by one of the port modules. Bus 135, on the other hand, operates to transport a data message from switch 140 to the other modules which monitor bus 135. Control of Bus 130 is based on a conventional priority contention scheme employing module number (address), and is implemented in each of the port modules 110-1 through 110-N, including control processor 140. Thus, a port module, e.g., port 110-1, contends for control of the bus to send a message to another port module, e.g., port 120. When it gains such control, the sending port may then place on bus 130 a packet message identifying the source of the message. Control processor and switch 140 responsive to receipt of the message establishes a so-called virtual circuit connection between the source and recipient using what is commonly referred to as a routing control memory (not shown).

It is seen from the FIG. that each port module operates to serve a particular device or a number of particular devices. For example, Data Access Module (DAM) 120 serves as an interface between LAM manager 350-1 (discussed below) and LAN gateway 100. As a further example, LAM module 110-1 serves a number of other LANs 300-1 and 300-2. In an illustrative embodiment of the invention each of the LANs 300 may be, for example, the well-known AppleTalk (trademark of Apple Computer, Inc.) network or a network driven by the AppleTalk network software. Each such network serves to provides data communications among a number of devices, such as terminals 300-11 through 300-N (The AppleTalk network is disclosed in the text entitled *Inside AppleTalk*, by G. S. Sidhu et al, published by Addison-Wesley Publishing Company, Inc., (hereinafter Sidhu reference) which is hereby incorporated by reference. A high-level discussion directed to the connectivity of the AppleTalk network is provided in the text entitled *HANDS-ON APPLETALK* by M. Rogers et al, published by Simon & Shuster Inc. of New York, which text is hereby incorporated by reference).

The current status of each LAM module, e.g., LAM 110-1, and the networks 300 that the LAM module serves is tracked by an associated LAM manager, e.g., LAM manager 350-1. In an illustrative embodiment of the invention, a LAM manager, which may be, for example, a so-called workstation, such as the Model 6386 Work Station available from AT&T, serves a number of LAM modules—illustratively 40—. The LAM modules served by a LAM manager may be associated with one or more LAN gateways. When a LAM module is inserted into one of the aforementioned connectors and is thus "powered up" and initialized, the associated control processor 140 establishes a virtual circuit connection between the LAM module and its associated LAM manager. Once the connection is established, the LAM module forwards to its associated LAM manager the address and device type of each active device of each network 300 that the LAM module serves. The associated LAM manager stores such information in its internal memory. The LAM manager does this so that it may respond when it receives from another internet LAM manager a message requesting the identities of a particular class of devices (e.g., printers) located in the same internet "zone" (discussed below) as the associated LAM manager.

As pointed out by the Rogers reference each network in an internet needs a distinct identity (network address) so that an internet message may be routed to the correct destination. As mentioned above, the administration of network addresses is a function that is manually performed by a network administrator. The administration of network addresses is typically a simple task when the internet is small, i.e., when the internet is formed from a relatively low number of networks. However, the task becomes unwieldy as the number of networks in an internet significantly increases and as internets merge with one another. The problem of administering network numbers may be exacerbated if a network is added to the internet without notifying the network administrator or if an assigned network address is incorrectly programmed into a respective network.

I have recognized that the task of manually administering network addresses may be eliminated, in accordance with the invention, by assigning to each network in an internet a common predetermined address and to a second address when the network desires to send to another network via the internet a message, in which the second address remains unknown to the sending network.

In particular, it is well-known that groups of such networks 300 and associated LAN gateways may be formed into so-called zones within an internet. As such, a user positioned at a terminal, for example, terminal 300-11 may invoke and bring up on the terminal 300-11 display a so-called "chooser" to identify particular resources within the internet. Such a display includes a scrollable list of zone names and a scrollable list of device types. To locate a particular resource, the user first selects one of the displayed device types that is of interest to the user and then selects a particular one of the displayed zones. (The way in which a user selects a displayed name, symbol or icon is well-known in the art and will not be discussed herein. It suffices to say, however, that such a selection may be obtained by pointing a so-called mouse cursor at the desired name, symbol or icon and operating (pressing) an associated mouse button.)

When the user makes such a selection, then terminal 300-11 which may be, for example, the well-known Macintosh (trademark of Apple Computer, Inc..) personal computer, displays the resources which match the selected criteria. For example, assume that LAN gateway 100 and the networks it serves as well as other LAN gateways and associated networks (not shown) form one zone of the internet, for example, zone A, and LAN gateway 200 and the networks it serves as well as other LAN gateways and associated networks (not shown) form another zone of the internet, for example, zone B. Also assume that the user positioned at terminal 300-11 desires to identify the printers located in zone B. Then all that user needs to do is to select the displayed device type identifying printers and to select the displayed name of zone B.

Terminal 300-11 responsive to such selections forms a so-called Name Binding Protocol (NBP) message requesting the identities (names) of all printers associated with zone B and transmits the message to its associated network bus 300-20. LAM 110-1 serving network 300-1 accepts the message and forwards it to LAM manager 350-1 via the so-called permanent virtual circuit connection priorly established between LAM 110-1 and DAM 120. (The various message formats and attendant protocols that are used in transporting messages, including the aforementioned NBP messages, within an AppleTalk network and between such networks are discussed in the aforementioned Sidhu reference.)

LAM manager 350-1, using a conventional routing algorithm, routes the message to the LAM managers located in zone B via respective pre-allocated virtual circuit connections, in which the message contains the address of LAM manager 350-1. Upon receipt of the broadcast message, each LAM manager associated with zone B, for example, LAM manager 350-2, queries each of its associated networks for devices, forms a message listing those that respond identifying themselves as printers, for example printer 300-50, and returns the message to LAM manager 350-1.

LAN manager 350-1 stores such messages in its internal memory as they are received and periodically forms a message identifying the printers located in zone B and sends the message to terminal 300-11 via LAM 110-1 and network 300-1 for display on terminal 300-11. At this point, the user positioned at terminal 300-11 may scroll through the displayed list of the zone B printers and, in a conventional manner, select one of them in order to establish a communications connection between terminal 300-11 and the desired printer. Assuming that the user desires a connection to printer 300-50, then terminal 300-11 responsive to the user selecting the displayed identity (name) of printer 300-50, transmits to network bus 300-20 and thus to LAM 110-1 a message requesting a connection to printer 300-50. LAM 110-1, in turn, forwards the message to LAM manager 350-1. LAM manager 350-1, in turn, sends to LAM 210-1 a message requesting that LAM 210-1 enter a request to establish a connection to LAM 110-1, which connection will allow terminal 300-11 and printer 300-50 to communicate with one another.

To do this, LAM 210-1 sends to the control processor 140 contained in LAN gateway 200 a conventional request to establish a connection to LAM 100-1. Control processor 140 of LAN gateway 200, in turn, forwards the request to LAN gateway 100 via communications path 151 and Trunk Access Module (TAM) 125 which then forwards the request to control processor 140 via bus 130. Control processor 140 responsive to the request, establishes, in a conventional manner, a virtual circuit connection between LAM 110-1 and TAM 125. In doing so, control processor 140 of LAN gateway 100 assigns to LAM 110-1 a channel number that LAM 110-1 will use to transmit messages via the virtual circuit connection. It will be assumed herein that the channel number (address) assigned to LAM 110-1 has a value of five. In addition, control processor 140 of LAN gateway 100 notifies control processor 140 of LAN gateway 200 that the request to establish a connection has been accepted. Control processor 140 of LAN gateway 200 responsive thereto establishes, in a conventional manner, a virtual circuit connection between LAM 210-1 and a network TAM (not shown) connected to communications path 151. Similarly, control processor 140 of LAN gateway 200 assigns to LAM 210-1 a channel number that LAM 210-1 will use to transmit messages via the virtual circuit connection. It will be assumed herein that the value of that channel number (address) is seven (7).

As mentioned above, each network 300 is assigned, in accordance with the invention, a common network address and a second network address in order to exchange messages with another network 300. In an illustrative embodiment of the invention, the common address has a value of—illustrative 65000—and the second network address is an address within the range of addresses of—illustratively 60000 to 64999—, in which the second address is assigned by the associated LAM.

In particular, it is seen from the FIG. that a LAM e.g., LAM 110-1, serves a number of networks 300, for example, two networks 300, via respective ports 1 and 2. In the FIG., ports 1 and 2 of LAM 110-1 are respectively designated 111-1 and 111-2. Similarly, ports 1 and 2 of LAM 210-1 are respectively designated 211-1 and 211-2. In the operation of the invention, a LAM, e.g., LAM 210-1, associates each network 300 that it serves, e.g., network 300-5, with a port address, e.g., port 2. In addition, the LAM relates the port address with the second address that it dynamically assigns to the associated network 300. It will be assumed herein that LAM 210-1 assigns to port 2 (211-2), and hence network 300-5, a second address of 60003 and records that address in an associated routing table, discussed below. Following that assignment, LAM 210-1 sends to LAM 110-1 a message indicating that the network address of printer 300-5 is 60003.

In addition, LAM 210-1, in accordance with an aspect of the invention, assigns to the remote network served by LAM 110-1 a destination address dynamically selected from the aforementioned range of addresses of 60000 to 64999. In the present illustrative example of the invention that address is assumed to be 60005. Similarly, LAM 210-1 records that address and associated channel number 7 in a respective record of its associated routing table, as will be shown below.

Similarly, LAM 110-1 at the time of forming the original request message, dynamically assigns to network 300-1, a second address of, for example, 60009, and inserts that address into the message so that a potential recipient may identify the originating network, i.e., network 300-1. Thereafter, LAM 110-1 assigns to the remote network served by LAM 210-1 a destination address of, for example, 60100. Similarly, LAM 110-1 records those addresses in respective records of an associated routing table, in which the latter address is associated with channel number 5.

To track the addresses that it assigns and the network address that it receives, a LAM, e.g., LAM 110-1, maintains in its internal memory a translation, or routing, table, as shown in FIG. 2. It is seen from the FIG. that LAM 110-1 has stored in record 401 the second address 60009 assigned to network 300-1 and has stored in record 402 the assigned destination address 60100. As will be shown below, LAM 110-1 uses record 401 to translate the common network address assigned to network 300-1 into the dynamically assigned second address of 60009, and uses record 402 to translate the local destination address 60100 associated with channel five into the destination address 60003 priorly received from LAM 210-1.

LAM 210-1 maintains a similar table, as shown in FIG. 3. It is seen from that FIG. that LAM 210-1 has stored in record 501 the second address 60003 assigned to remote network 300-5 and has stored in record 502 the destination address 60005 assigned to remote network 300-1. Similarly, LAM 210-1 uses record 501 to translate the common address into the dynamically assigned second network address of 60003, and uses record 502 to translate the local destination address of 60005 into the network address 60009 received from LAM 110-1.

Following the foregoing, terminal 300-11 may then begin communicating with printer 300-50. To do so, terminal 300-11 inserts in a source field and destination field of a message (datagram) that it desires to send to printer 300-50 source address 65000 and destination address 60100, respectively. Terminal 300-11 then transmits the message to network bus 300-20. LAM 110-1 connected to bus 300-20 via its associated port 1 (designated 111-1 in the FIG.) accepts the message, and translates the contents of the associated source and destination fields in accordance with records 401 and 402 of table 400-1. That is, LAM 110-1 translates the source address 65000 into address 60009 and translates the destination address 60100 into 60003. LAM 110-1 then attaches to the message a header containing the assigned channel number 5. LAM 110-1 then passes the result to LAN gateway 100 via bus 130. LAN gateway 100 in a conventional manner forwards the message to LAN gateway 200 via the respective virtual circuit connection established between LAMs 110-1 and 210-1.

Upon receipt of the message, LAM 210-1 translates, in accordance with records 501 and 502 of table 400-2, the contents of the associated source and destination fields. That is, LAM 210-1 deletes the message header and translates the destination address 60003 into common address 65000 and translates the source address 60009 into address 60005. LAM 210-1 then passes the resulting message to port 2 and bus 300-21 for delivery to printer 300-50, as indicated by routing record 501. LAM 210-1 performs the reverse translation in connection with a printer 300-50 message that LAM 210-1 receives via bus 300-21 and the associated port 2 (211-1). That is, LAM 210-1, based on routing record 502, translates the contents (65000) of the source field into address 60003 and translates the contents (60005) of the destination field into address 60009. LAM 210-1 then attaches to the message a header containing the address and assigned channel number 7, obtained from routing record 502, and then passes the resulting message to LAN gateway 200 for delivery to LAM 110-1 via the aforementioned virtual circuit connection.

LAM 110-1 responsive to receipt of a printer 300-50 message via LAN gateway 100 deletes the message header and translates, in accordance with the contents of records 401 and 402, the associated source and destination fields and delivers the resulting message to terminal 300-11 via bus 300-20. Terminal 300-11 and printer 300-50 may continue to exchange messages with one another, in which the contents of the source and destinations fields of each such message are translated at both the source LAM and destination LAM in the manner discussed above.

As will be shown below, each LAM, e.g., LAM 110-1 includes a timer for timing the interval between messages that the LAM receives from a device that it is serving, e.g., terminal 300-11. In the event that the interval reaches a predetermined level—illustratively five minutes—then the associated LAM will conclude that the device it is serving has completed its transmission of messages. In that event, then, the LAM will clear (erase) the associated translation records, e.g., records 401 and 402, and notify the associated control processor 140 to terminate the respective virtual circuit connection if that connection is no longer needed.

Figure 4:
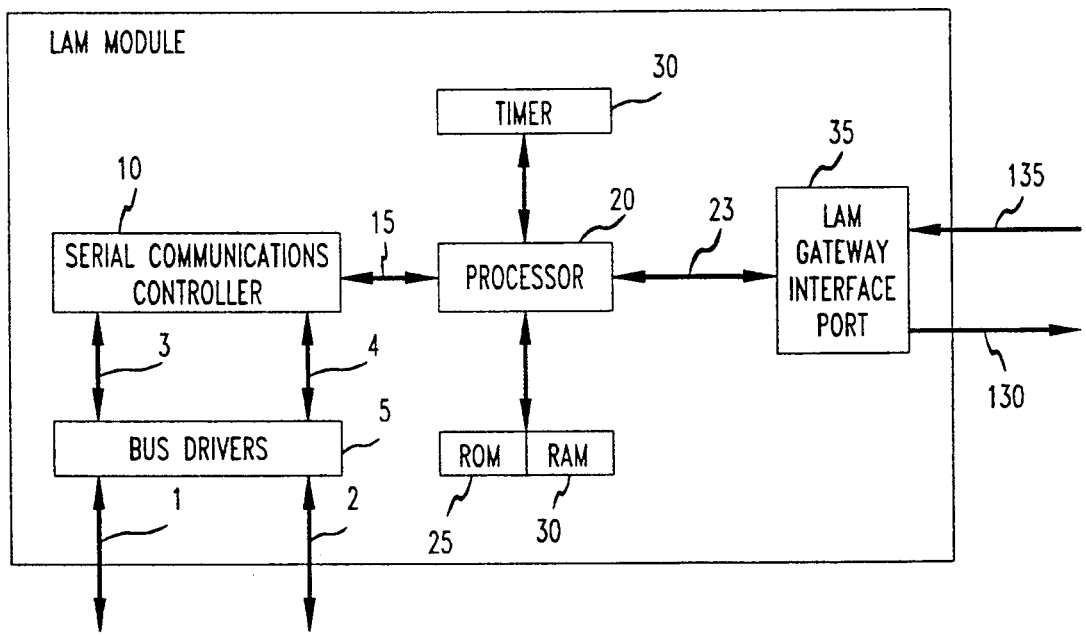
FIG. 4 is a broad block diagram of a LAN access module used within the LAN gateway of FIG. 1.

Turning now to FIG. 4 there is shown a broad block diagram of the functions implemented by a LAM module, e.g., LAM 110-1. In particular, a LAM includes, inter alia, conventional bus transreceiver circuit 5 which connect to ports 1 and 2 to interface the LAM with respective network 300 busses, for example, busses 300-20 and 300-22 (FIG. 1). In an illustrative embodiment of the invention, ports 1 and 2 are compatible with the AppleTalk network serial bus arrangement, and extend via respective transreceiver circuits and serial busses 3 and 4 to serial communications controller 10.

Serial communications controller 10, which may be, for example, the model 8530 serial communications controller available from Zilog Inc., converts a serial-bit stream representing a message that is received via either serial bus 3 or 4 into a parallel bit stream and presents the result to processor 25 via parallel bus 15. In doing so, controller 10 checks the message for possible bit errors using a conventional error checking arrangement, such as, for example, the well-known cyclic redundancy error checking scheme. In addition, controller 10 implements a so-called "link layer" protocol, which "flags" the beginning and end of a message using a predetermined pattern of bits (i.e., binary ones and zeroes).

Alternatively, controller 10 converts a parallel-bit stream that it receives via bus 15 into a serial-bit stream and presents that result to the respective serial bus 3 or 4.

Processor 20, which may be, for example, the model 68000 processor available from Motorola, implements, inter alia, the invention in the LAM module, as will be discussed below. Processor 20 also implements a so-called LocalTalk (trademark of Apple Computer, Inc.) Link Access Protocol (LLAP) as well as handling various protocol details, such as request-to-send and clear-to-send messages received from a terminal via either port 1 or 2. Datagrams, or messages, which processor 20 receives via bus 15 are stored in RAM 30 and are then processed in accordance with a so-called Datagram Delivery Protocol (DDP). That is, processor 20, using the destination address contained in a datagram, indexes a routing table stored in RAM 30 and unloads from the table an associated routing address. Processor 20 then routes the datagram to its next destination in accordance with the associated routing index, in which such routing is obtained via gateway interface 35 and the associated LAN gateway, e.g., LAN gateway 100. The associated routing address may cause the datagram to be routed to, for example, another LAM circuit or TAM circuit each served by the associated LAN gateway. (The LLAP and DDP protocols are discussed in the above-mentioned Sidhu reference.)

Datagram messages which processor 20 receives via bus 23 are also stored in an associated RAM 30 buffer and are then processed in the manner discussed above for delivery to either port 1 or 2, as the case may be.

LAM gateway interface 35 serves to transmit to bus 130 messages that interface 35 had received from processor 20 via bus 23. That is, interface 35 loads messages in a so-called first-in, first-out (FIFO) buffer as they are received from processor 20 via bus 23. Thereafter, interface 35 reads each message out of the FIFO, and converts the message to a serial-bit stream as it is being transmitted to bus 130. (To access bus 130, interface 35 implements a conventional bus contention scheme and begins to transmit messages when such access is granted, as discussed below.)

In addition, interface 35 accepts from broadcast bus 135 messages bearing the address of the associated LAM. Such messages are converted from a serial-bit stream to a parallel-bit stream and stored in an associated FIFO implemented in RAM 30. Thereafter, interface 35 unloads the received messages, one at a time, from the associated FIFO and presents them to processor 20 via bus 23.

Timer 30 is used to generate various clock signals that are used locally for system synchronization and to implement the aforementioned LLA protocol. ROM 25 is used to store, inter alia, the program which drives processor 20 and the program which implements the invention in processor 20.

Figure 5:
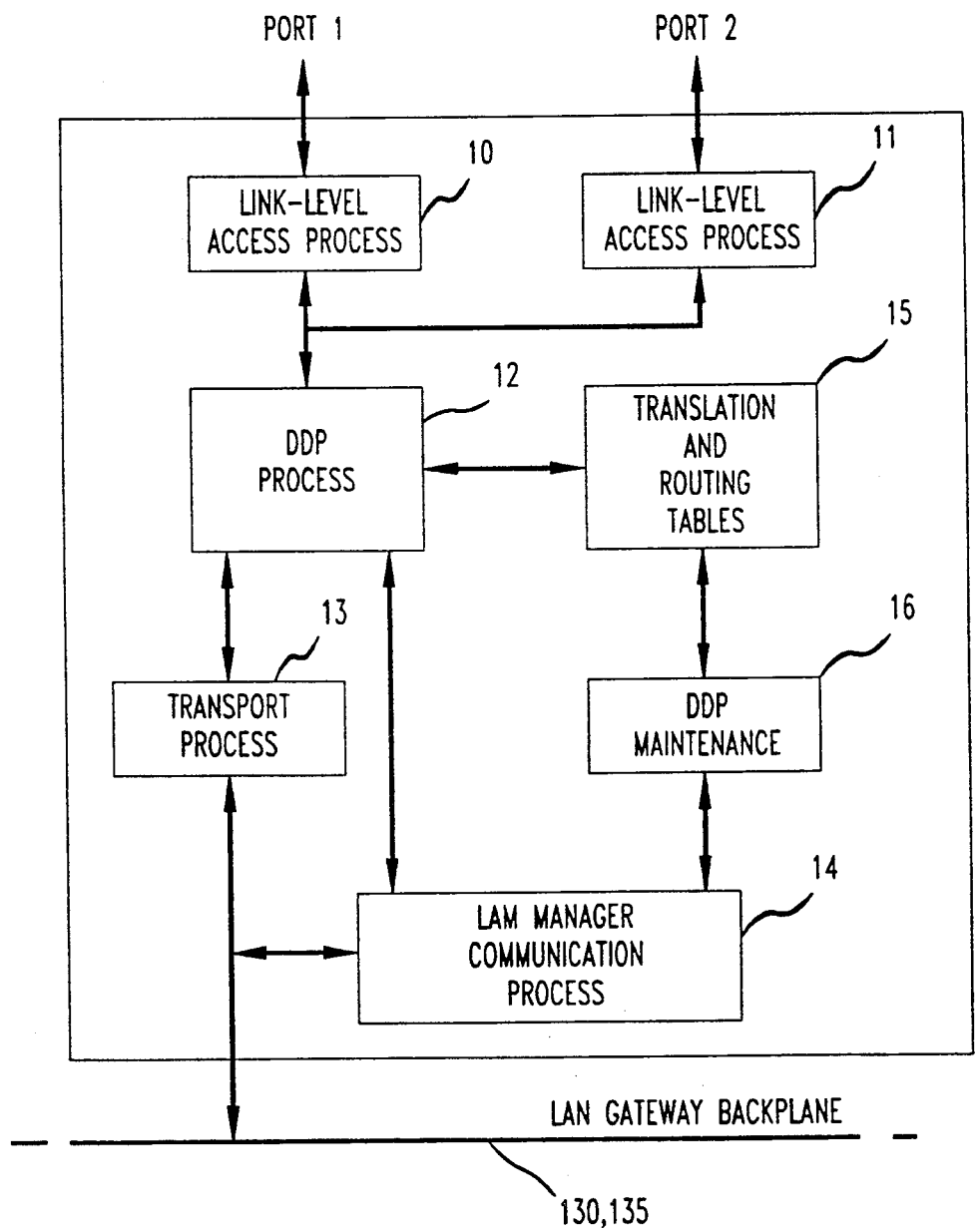
FIG. 5 is a broad block diagram of the software processes which drives the LAN access module of FIG. 4.

Turning now to FIG. 5, there is shown a broad block diagram of the various software processes which control respective actions performed by a LAM. Specifically, Link-Level Access Processes (LLAP) 10 and 11 are identical to one another and interface, at the physical level, the associated LAM with ports 1 and 2, respectively. That is, processes 10 and 11 are the software drivers which interface DDP (Datagram Delivery Protocol) routing and mapping process 12 with respective network 300 busses. A message which is received via a respective port is passed to process 12 and a message received from process 12 is forwarded to the respective port.

DDP process 12 processes a message received via one of the LLAP processes or LAN gateway backplane bus 135. In doing so, process 12 examines the message to determine if the message should be delivered to the LAM manager via LAM manager communication process 14. Messages which are passed to process 14 include the aforementioned NBP message. For other messages, DDP process 12 checks the associated translation and routing tables 15 to determine if they are associated with a respective virtual circuit connection. If that is the case, then DDP process 12 performs the translations discussed above and passes the result to transport process 13. Transport process 13 formats the message in accord with the transmission protocol expected by the associated LAM gateway and then presents the message to backplane bus 130. Messages which transport process 13 accepts from backplane bus 135 are passed to DDP process 12, which, then, performs the various translations and presents the result to either LLAP 10 or 11.

DDP maintenance 16 is a table of entries which track the use of addresses that control processor 140 has assigned to the associated LAM. That is, each such address is associated with a so-called "last-time used" time stamp and a respective time-out value. If a routing record is not used within the time-out value, then the associated LAM manager is notified. The LAM manager, in turn, may then delete the entry from the table.

Figure 6:
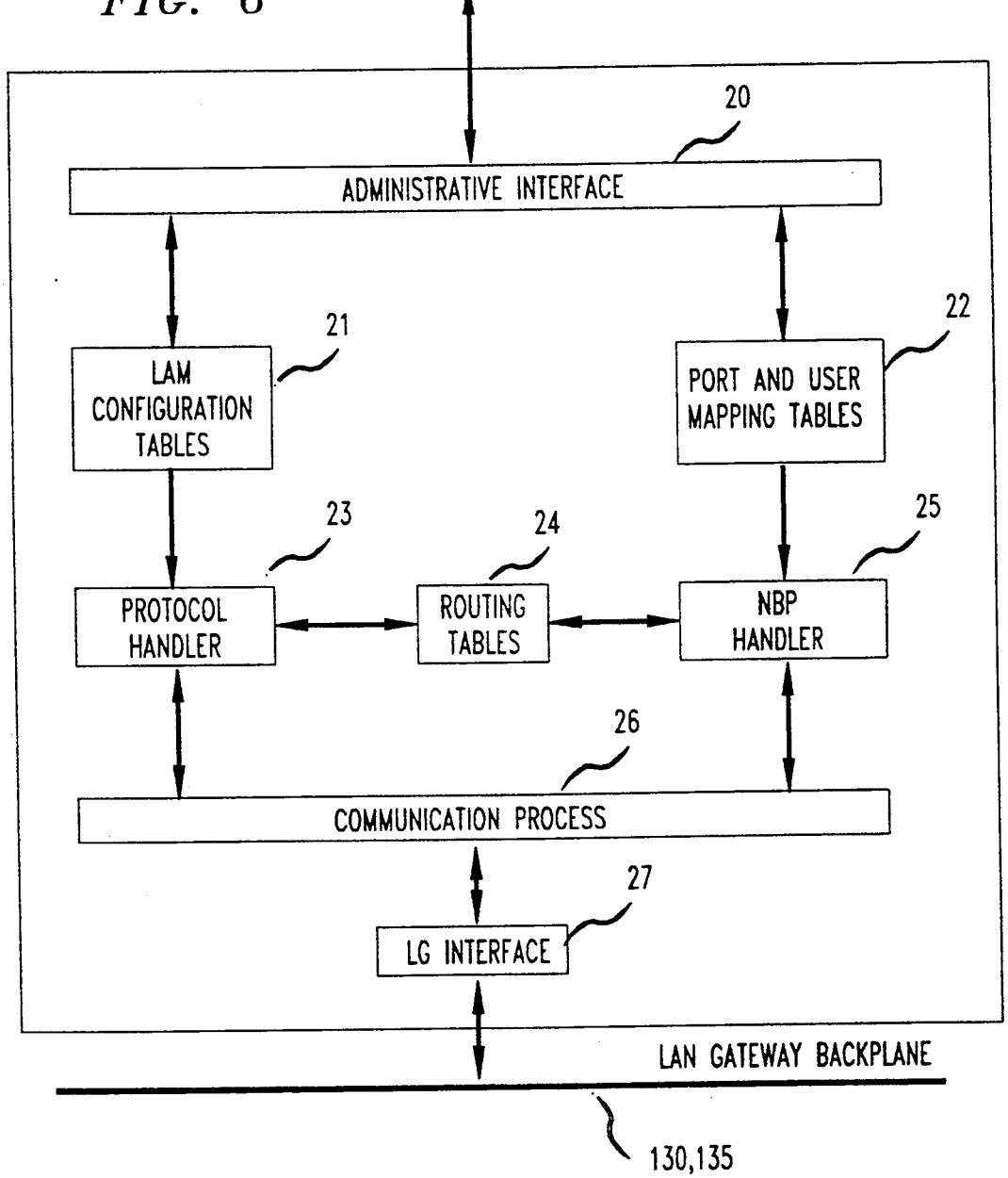
FIG. 6 is a broad block diagram of the software processes which drives the LAN manager of FIG. 1.

Turning now to FIG. 6, there is shown a broad block diagram of the software processes which drive a LAM manager. In particular, administrative interface process 20 interfaces a system user terminal, for example, an administrative terminal, with the LAM manager for the purpose of allowing the user to enter, change and/or verify various configuration information needed by the LAM manager. Such configuration information may be, for example, the zone name associated with each LAM served by the respective LAM manager, in which such information is stored in associated tables 21. Such information may also be translation data that is used by the LAM manager to map zone names into a so-called hierarchical list of zone names, which are stored in tables 22.

Protocol handler process 23 processes particular messages originated by a terminal, e.g., terminal 300-11, or by a so-called AppleTalk router (not shown), in which such messages may include, for example, Zone Information Protocol (ZIP) messages discussed in the aforementioned Sidhu reference. NBP handler process 25, on the other hand, processes the aforementioned name binding protocol messages, discussed above. Process 23 and Handler 25 receive such messages from, and return their respective responses to communications process 26. Communication process 26 is the software which interfaces the various LAM manager processes with LG(LAN Gateway) interface process 27. Process 27, in turn, interfaces the LAM manager with the associated LAN gateway backplane comprising busses 130 and 135. Thus, a message that is received via bus 27 is passed to process 26, which, in turn, passes the message to the appropriate process, e.g., process 23. LAN gateway (LG) interface process 27 may be, for example, the Datakit multiplexed interface software available from AT&T. Such software supports establishment and termination of a virtual circuit connection as well as the transport of a data message via the connection.

The routing tables 24 are used to maintain a list of some of the active (in service) networks 300 and their respective zones.

The foregoing is merely illustrative of the principles of my invention. Those skilled in the art will be able to devise numerous arrangements, which, although not explicitly shown or described herein, nevertheless embody those principles that are within the spirit and scope of the invention.

I claim:

1. A network addressing arrangement for use in an internetwork comprising
   at least first and second networks forming said internetwork, said first and second networks being arranged to exchange messages with one another, each of said messages containing source and destination addresses,
   means for assigning a common, first internetwork address to said first and second networks for use as a respective source address,
   means, operative prior to the actual exchange of said messages, for dynamically assigning to said first and second networks respective second internetwork addresses, and
   means, responsive to receipt of a message from said first network, for changing the source and destination addresses contained in said message respectively to the second internetwork address assigned to said first network and the second internetwork address assigned to said second network, and for then supplying the resulting message to said second network.

2. The arrangement set forth in claim 1 further comprising means, operative when said first and second networks discontinue exchanging messages with each other, for canceling said second internetwork addresses respectively assigned to said first and second networks.

3. An arrangement for assigning network addresses in an internetwork formed from a first network and a plurality of second networks, said networks requiring respective internetwork addresses in order to exchange messages with one another, said networks being associated with respective interconnected switching nodes, said arrangement comprising
   means for assigning to each of said networks a first internetwork address common to said networks, and
   means, contained in a node associated with said first network and operative responsive to a connection being established between said first network and one of said second networks, for dynamically associating said first network with a second internetwork address and associating said connection with a third internetwork address, for supplying said third internetwork address to said first network as the address of said one of said second networks, and for supplying said second internetwork address to a node associated with said one of said second networks as the internetwork address of said first network.

4. The arrangement set forth in claim 3 further comprising means, contained in the node associated with said first network and operative when said first and said one of said second networks discontinue exchanging messages with each other, for canceling said second and third internetwork addresses assigned to said first network.

5. The arrangement set forth in claim 3 further comprising means, contained in the node associated with said first network and operative responsive to receiving from said first network a message containing said common first internetwork address as a source address and containing said third internetwork address as a destination address, for changing said common first internetwork address to said second internetwork address and changing said third internetwork address to another second internetwork address associated with said one of said second networks as a result of establishing said connection, and for then forwarding the changed message to said one of said second networks via said connection.

6. The arrangement set forth in claim 5 wherein said means for changing includes means, operative responsive to receiving via said connection a message containing as said source address said another second internetwork address associated with said one of said second networks and containing as said destination address said second internetwork address associated with said first network, for changing said source and destination addresses to said third and common first internetwork addresses, respectively, and for forwarding the changed message to said first network.

7. The arrangement set forth in claim 3 wherein each of said switching nodes is a virtual circuit switch operative as an internetwork gateway and said connection is a virtual circuit connection.

8. A method of dynamically assigning network addresses in an internetwork composed of at least first and second networks arranged to exchange messages with one another, in which each of said messages contain source and destination addresses, said method comprising the steps of assigning a first internetwork address to said first and second networks for use as as a common source address, dynamically assigning to said first and second networks, just prior to the actual exchange of said messages, respective second internetwork addresses, and responding to receipt of a message from said first network by changing the source and destination addresses contained in said message respectively to the second internetwork address assigned to said first network and second internetwork address assigned to said second network, and then supplying said message to said second network.

9. A method of assigning network addresses in an internetwork formed from a first network and a plurality of second networks, said networks requiring respective internetwork addresses in order to exchange messages with one another, said networks being associated with respective interconnected switching nodes, said method comprising the steps of assigning a first common internetwork address to each of said networks, responding to a connection established between said first network and one of said second networks by dynamically associating said first network with a second internetwork address and associating said connection with a third internetwork address, and then supplying said third internetwork address to said first network as the address of said one of said second networks, and supplying said second internetwork address to a node associated with said one of said second networks as the internetwork address of said first network.

10. The method set forth in claim 9 further comprising the step of responding when said first and said one of said second networks discontinue exchanging messages with each other by cancelling said second and third internetwork addresses that were assigned to said first network.

11. The method set forth in claim 9 further comprising the step of responding to receiving from said first network a message containing said first common internetwork address as a source address and containing said third internetwork address as a destination address by changing said first common internetwork address to said second internetwork address assigned to said first network and changing said third internetwork address assigned to said first network to another second internetwork address assigned to said one of said second networks as a result of establishing said connection, and then forwarding the changed message to the node associated with said one of said second networks via said connection.

12. The method set forth in claim 11 wherein the step of responding and changing includes the step of responding to receipt via said connection a message containing as said source address said another second internetwork address and containing as said destination address said second internetwork address associated with said first network by changing said source and destination addresses to said third and common internetwork addresses, respectively, and then forwarding the changed message to said first network.

* * * * *